United States Patent [19]

Shiga et al.

[11] Patent Number: 4,554,264

[45] Date of Patent: Nov. 19, 1985

[54] PROCESS FOR PRODUCING α-OLEFIN POLYMERS USING NOVEL CATALYST SYSTEM

[75] Inventors: Akinobu Shiga, Koganei; Toshio Sasaki, Ichihara; Junpei Kojima, Ichihara; Akira Nunose, Ichihara, all of Japan

[73] Assignee: Sumitomo Chemical Company, Limited, Osaka, Japan

[21] Appl. No.: 631,177

[22] Filed: Jul. 16, 1984

[30] Foreign Application Priority Data

Jul. 27, 1983 [JP] Japan ................................ 58-138471

[51] Int. Cl.$^4$ ................................................ C08F 4/64
[52] U.S. Cl. ................................... 502/112; 502/107; 502/108; 502/119; 526/137
[58] Field of Search ................ 502/119, 112, 108, 107

[56] References Cited

U.S. PATENT DOCUMENTS

| | | | |
|---|---|---|---|
| 3,135,809 | 6/1964 | Bosmajian | 502/103 X |
| 4,165,298 | 8/1979 | Shiga et al. | 502/112 X |
| 4,309,521 | 1/1982 | Sato et al. | 502/108 X |
| 4,325,837 | 4/1982 | Capshew et al. | 502/108 |

*Primary Examiner*—Patrick P. Garvin
*Attorney, Agent, or Firm*—Stevens, Davis, Miller & Mosher

[57] ABSTRACT

A process for producing an α-olefin polymer which comprises polymerizing an α-olefin in the presence of a catalyst system comprising (A) a solid catalyst component obtained by steps of
 (i) reducing titanium tetrachloride with an organoaluminum compound represented by the general formula $R^1{}_nAlY_{3-n}$, wherein $R^1$ represents a $C_1$–$C_{18}$ hydrocarbon group, Y represents a halogen, and n represents a number satisfying $1 < n < 3$,
 (ii) heating the reduction product at a temperature of up to 150° C.,
 (iii) treating the thus obtained solid product containing γ-titanium trichloride by preliminary polymerization of an α-olefin in the presence thereof, and
 (iv) reacting the resulting solid product with a halogen represented by the general formula $X_2$, wherein X represents Cl, Br, or I, and/or an interhalogen compound represented by the general formula $X'X''a$, wherein $X'$ and $X''$ represent each Cl, Br, or I and represents 1 or 3, and with an ether compound represented by the general formula $R^2$—O—$R^3$, wherein $R^2$ and $R^3$ are the same or different and represent each a $C_1$–$C_{10}$ alkyl group, in a hydrocarbon solvent at a temperature of 50° to 100° C., and (B) an organoaluminum compound.

8 Claims, 1 Drawing Figure

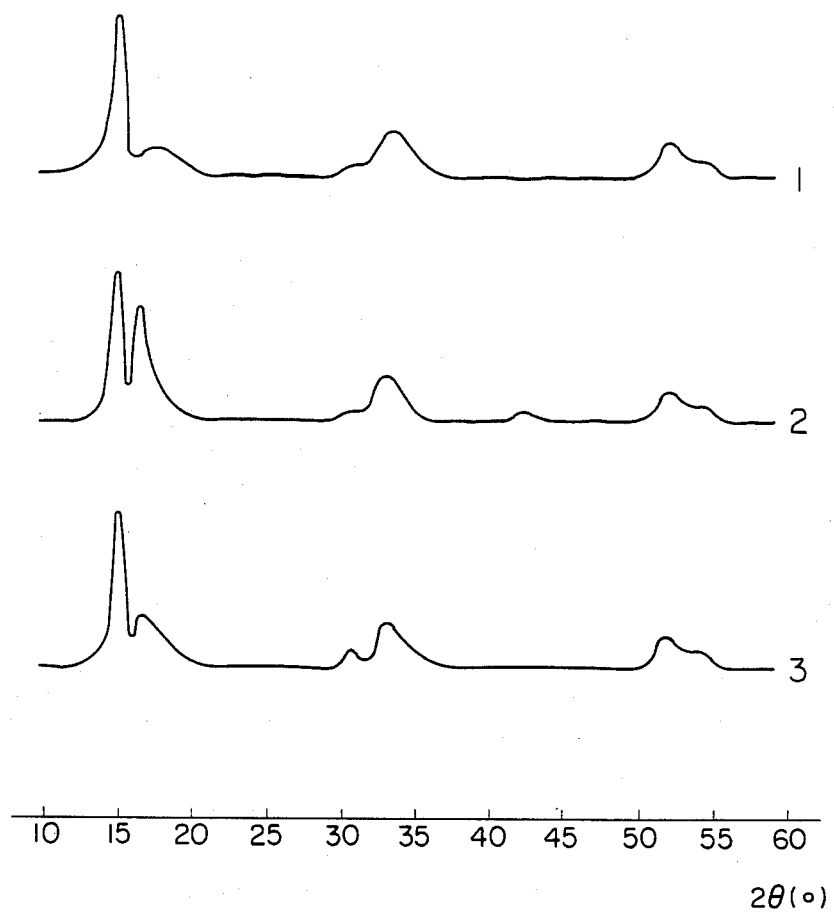

PROCESS FOR PRODUCING α-OLEFIN POLYMERS USING NOVEL CATALYST SYSTEM

BACKGROUND OF THE INVENTION

The present invention relates to a novel catalyst system using a novel solid catalyst component for the polymerization of α-olefins and a process for producing α-olefin polymers using such catalyst system.

Catalyst systems comprising titanium trichloride and an organoaluminum compound have hitherto been used for the industrial production of high crystalline polymers of α-olefins such as propylene, butene-1, etc. Since the polymerization proceeds in such a state that a solid titanium trichloride is embraced by the formed polymer, the titanium trichloride partly remains in the product polymer. This residue causes adverse effects on the color, heat stability, and other properties of the polymer. Hence, an extraction step was generally necessary to remove the residue from the polymer. On the other hand, an amorphous polymer called "atactic polymer" is incidentally produced in the polymerization. When remaining in the product polymer, said atactic polymer deteriorates mechanical properties of molded products of the polymer and may give stickiness thereto. This required generally a washing step for removing the atactic polymer from the objective polymer.

These additional operations resulted in economical disadvantages with respect to materials and energy, so that a simplified process was intensively desired. Up to now, various improvements have been made in the preparation of titanium trichloride. As a result, the polymerization activity and/or stereospecificity of the catalyst were greatly improved and this enabled the industrialization of polymerization processes simplified with respect to the above-said operations. The present inventors disclosed formerly such an improved process for preparation of titanium trichloride in Japanese Patent Publication No. 27085/80 and subsequently a further improvement of this process in Japanese Patent Application Kokai (Laid-Open) No. 116706/81. However, when the solid product obtained by reducing titanium tetrachloride with an organoaluminum compound or the heat-treated material of said solid product was used as a titanium trichloride composition as described in the above patents, parts of these titanium trichloride composition particles were disintegrated into fine particles during the activation treatment of the composition with a halogen compound-ether compound mixture or with a halogen compound-ether compound-electron donative compound mixture, resulting in a great difficulty of filtration in the washing of the activated composition. This obliged the use of the decantation method, which was inferior in the effect of solid-liquid separation. Additionally, on drying the washed composition, a great number of stiff agglomerates were produced therefrom. When said titanium trichloride composition was used as such for the polymerization of olefin, there were fears of clogging of the solid-catalyst feed line was such agglomerates and of the polymer discharge valve with polymer blocks formed in the polymerization reactor. It was therefore necessary to remove the agglomerates by sieving or the like.

There have been proposed some methods in order to prevent the disintegration of titanium trichloride particles during the activation treatment. The proposed methods comprise polymerizing a small amount of α-olefins on a β-titanium trichloride-containing solid product obtained by reducing titanium tetrachloride with an organoaluminum compound, prior to the activation treatment of this solid product (Japanese Patent Application Kokai (Laid-Open) Nos. 58206/80, 145117/81, and 5314/83). According to these methods, the disintegration of titanium trichloride particles is surely prevented, but coarse particles of the catalyst are formed by agglomeration particularly when propylene is preliminarily polymerized on the catalyst or when the activation treatment is conducted in an aromatic hydrocarbon solvent.

As a result of intensive studies, the present inventors found a novel catalyst system using a novel solid catalyst component for α-olefin polymerization, which is highly active, highly stereospecific, and good in particle character. Said solid catalyst component is prepared by the reduction of titanium tetrachloride with an organoaluminum compound, heat treatment of the reduction product, preliminary polymerization of α-olefin to treat the thus obtained solid product containing γ-titanium trichloride, and activation treatment of the preliminary polymerization treated product with a halogen and/or an interhalogen compound and with an ether compound. Based on this finding, this invention has been accomplished.

SUMMARY OF THE INVENTION

An object of the present invention is to provide a novel solid catalyst component for the polymerization of α-olefins.

Other object of the present invention is to provide a process for producing an α-olefin polymer in the presence of a catalyst system using said solid catalyst component.

Other objects and advantages of the present invention will become apparent from the descriptions below.

BRIEF DESCRIPTION OF THE DRAWINGS

In the accompanied drawing, numerals 1, 2 and 3 show X-ray diffraction spectra of the γ-titanium trichloride-containing solid products of Example 1, Comparative Example 2 and Example 3, respectively.

These X-ray diffraction spectra were obtained by using the Cu-Kα ray. In the drawing, the scale of abscissa indicates the double ($2\theta$) of the diffraction angle and the scale of ordinate indicates the intensity of the spectral line.

DETAILED DESCRIPTION OF THE INVENTION

According to the present invention, there are provided a solid catalyst component for the polymerization of α-olefins obtained by steps of (i) reducing titanium tetrachloride with an organoaluminum compound represented by the general formula $R^1{}_nAlY_{3-n}$, wherein $R^1$ represents a $C_1$–$C_{18}$ hydrocarbon group, Y represents a halogen, and n represents a number satisfying $1 < n < 3$, (ii) heat-treating the reduction product at a temperature of up to 150° C., (iii) treating the thus obtained solid product containing γ-titanium trichloride, by preliminary polymerization of an α-olefin in the presence thereof, and (iv) reacting the resulting solid product with a halogen represented by the general formula $X_2$, wherein X represents Cl, Br, or I, and/or an interhalogen compound represented by the general formula X'X''a, wherein X' and X'' represent each Cl, Br, or I and a represents 1 or 3, and with an ether compound represented by the general formula $R^2$—O—$R^3$, wherein $R^2$ and $R^3$ are the same or different and represent each a $C_1$–$C_{10}$ alkyl group, in a hydrocarbon solvent at a temperature of 50° to 100° C., and a process for producing an α-olefin polymer which comprises polymerizing an α-olefin in the presence of a catalyst system comprising (A) the thus obtained solid catalyst component and (B) an organoaluminum compound.

According to the present invention, a highly active and highly stereospecific catalyst system using a solid catalyst component almost completely free of too fine and too large particles for α-olefin polymerization can be obtained by a preliminary propylene polymerization treatment of the γ-titanium trichloride-containing solid product, even if followed by severe conditions of treatment such as treating the resulting solid product with mixture of halogen and/or an interhalogen compound and with an ether compound in an aromatic solvent at a high temperature. In consequence, the catalyst system of this invention is characterized by providing an α-olefin polymer excellent in particle character, free of too fine and too large particles.

The organoaluminum compound used in the present invention for reducing titanium tetrachloride is represented by the general formula $R^1{}_nAlY_{3-n}$. In the formula; $R^1$ represents a $C_1$–$C_{18}$ hydrocarbon group, preferably $C_1$–$C_8$ hydrocarbon group, particularly preferably $C_2$–$C_4$ linear or branched hydrocarbon group; Y represents a halogen, preferably Cl; and n represents a number satisfying $1 < n < 3$, preferably $1 < n \leq 2$. Examples of the organoaluminum compound are methyl aluminum sesquichloride, ethylaluminum sesquichloride, isobutylaluminum sesquichloride, dimethylaluminum chloride, diethylaluminum chloride, diethylaluminum bromide, diethylaluminum iodide, di-n-propylaluminum chloride, di-n-bytylaluminum chloride, diisobutylaluminum chloride, and mixtures of these compounds. Among these, preferred are diethylaluminum chloride, ethylaluminum sesquichloride, a mixture thereof and mixtures of ethylaluminum sesquichloride with ethylaluminum dichloride, and particularly preferred is ethylaluminum sesquichloride.

The reduction of titanium tetrachloride is favorably carried out in an inert hydrocarbon solvent, particularly in an aliphatic hydrocarbon solvent such as hexane or heptane, at a temperature of $-50°$ to 50° C., particularly $-30°$ to 30° C. For instance, the reduction is preferably carried out by adding a solution of an organoaluminum compound in an inert hydrocarbon to a solution of titanium tetrachloride in an inert hydrocarbon in limited amounts so as to keep the mixed system at a prescribed temperature. Suitable concentrations of titanium tetrachloride and the organoaluminum compound in the respective inert hydrocarbon solutions are both 20 to 80%, particularly 30 to 60%, by weight. Suitable molar ratios of the organoaluminum compound represented by the formula $R^1{}_nAlY_{3-n}$ to titanium tetrachloride for the reaction are $n^{-1}$ to $2\times(n-1)^{-1}$: 1, particularly $1\times(n-1)^{-1}$ to $1.5\times(n-1)^{-1}$: 1 (herein the number of moles of the organoaluminum compound is calculated on the assumption that the compound is in monomeric form). Preferably, the reduction is carried out under moderate agitation. After mixing titanium tetrachloride with an organoaluminum compound, the agitation is desired to continue for 15 minutes to 6 hours at a temperature within the above-mentioned range to complete the reduction. Thus a suspension of the reduced solid is obtained.

Then the γ-titanium trichloride-containing solid product is prepared by heat treatment of the reduced solid. The γ-titanium trichloride-containing solid product in this invention is a titanium trichloride composition giving an X-ray diffraction spectrum in which the intensity of the spectral line (diffraction peak height) due to the lattice spacing d=5.43 Å is up to 50%, preferably up to 40%, of the intensity of the spectral line (diffraction peak height) due to the lattice spacing d=5.83Å. When the former intensity is higher than 50% of the latter, particles of such a solid product agglomerate into large particles in the activation treatment step, and the resulting solid catalyst component indicates low activity and poor stereospecificity.

The heat treatment is carried out preferably by using the suspension of the reduced solid as such though feasible after separation of the reduced solid from the suspension liquid and washing the solid with an inert hydrocarbon solvent. The suspension of the reduced solid can be heat-treated at a temperature of up to 150° C., preferably 70° to 130° C., particularly 75° to 110° C. Optimum temperatures of the heat treatment depend upon the organoaluminum compound used for the reduction. For instance, the optimums are 75° to 100° C. for ethylaluminum sesquichloride and 80° to 110° C. for diethylaluminum chloride. Suitable periods of the heat treatment are 15 minutes to 6 hours, particularly 30 minutes to 4 hours. Thus the γ-titanium trichloride-containing solid product can be obtained.

The γ-titanium trichloride-containing solid product obtained as described above can be subjected as such, without isolating from the liquid, to the preliminary α-olefin polymerization treatment under certain polymerization conditions without adding any organoaluminum compound. Preferably, the preliminary polymerization treatment is carried out on the γ-titanium trichloride-containing solid product which has been separated from the suspension liquid after completion of the heat treatment, and washed several times with an inert hydrocarbon solvent such as hexane or heptane. That is, the preliminary polymerization treatment is accomplished by suspending 10 g of the γ-titanium trichloride-containing solid product in 20–200 ml of an inert hydrocarbon solvent such as hexane or heptane, adding 0.1–20 g of the same organoaluminum compound as will be used for the main polymerization, and polymerizing an α-olefin at a temperature of 25° to 80° C., preferably 30° to 60° C., under a gage pressure of 0 to 10 kg/cm², generally for 5 minutes to 4 hours. In the preliminary polymerization, hydrogen may be added to regulate the molecular weight. Suitable amounts of the α-olefin preliminary polymerized are 0.01 to 5 g, particularly 0.03 to 1 g, per 1 g of the γ-titanium trichloride-containing solid product. Ethylene or propylene is used as α-olefin for the preliminary polymerization treatment. Propylene gives better results. After completion of the preliminary polymerization treatment, the resulting solid product is separated from the liquid medium and washed several times with an inert hydrocarbon solvent such as hexane, heptane, cyclohexane, methylcyclohexane, toluene, or xylene.

The solid product obtained by the preliminary polymerization treatment (hereinafter referred to as the preliminary polymerization treated solid) is then reacted with a halogen and/or interhalogen compound and with an ether compound.

The halogen is represented by the general formula $X_2$, wherein X is Cl, Br, or I, preferably I. The interhalogen compound is represented by the general formula $X'X''a$, wherein $X'$ and $X''$ represent each Cl, Br, or I and a is 1 or 3. Such interhalogen compounds include, for example, bromine chloride, iodine chloride, iodine trichloride, and iodine bromide. Of these interhalogen compounds, particularly preferred are those containing iodine, specifically iodine trichloride. Suitable amounts of the halogen or interhalogen compound used are $1 \times 10^{-5}$ to $5 \times 10^{-2}$ mole, particularly $1 \times 10^{-4}$ to $1 \times 10^{-2}$ mole, per 1 g of the γ-titanium trichloride-containing solid product.

Preferably, the halogen and/or the interhalogen compound are used in the form of solution in a hydrocarbon solvent and/or in an ether compound.

The ether compound is represented by the general formula $R^2$—O—$R^3$, wherein $R^2$ and $R^3$ are the same or different and represent each a $C_1$–$C_{10}$ alkyl group. Suitable examples of the ether compound are diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, and ethyl isobutyl ether. Di-n-butyl ether and diisoamyl ether are particularly preferred. The amount of the ether compound used is generally $1 \times 10^{-4}$ to 0.03 mole, preferably $1 \times 10^{-3}$ to 0.02 mole, particularly preferably 0.002 to 0.01 mole, per 1 g of the γ-titanium trichloride-containing solid product.

The reaction of the preliminary polymerization treated solid with the halogen and/or interhalogen compound and with the ether compound is preferably carried out in a hydrocarbon solvent as stated above. Examples of the hydrocarbon solvent are aliphatic hydrocarbons such as hexane, heptane, octane, and decane and aromatic hydrocarbons including benzene, toluene, and xylene. Suitable concentrations of the preliminary polymerization treated solid in the hydrocarbon solvent are 50 to 500 g/l, particularly 100 to 400 g/l. The reaction is carried out at a temperature of 50° to 100° C., preferably 70° to 90° C., for a period of 5 minutes to 6 hours, preferably 15 minutes to 2 hours, while stirring such a suspension of the preliminary polymerization treated solid. For instance, the suspension of the preliminary polymerization treated solid is heated at a predetermined temperature, and then a mixture of the halogen and/or interhalogen compound with the ether compound is added thereto or a solution of the halogen and/or interhalogen compound in the hydrocarbon and the ether compound are separately added.

In the reaction of the preliminary polymerization treated solid with the halogen and/or interhalogen compound and with the ether compound, another electron donative compound may be added. The electron donative compound is selected from certain organic compounds containing nitrogen, oxygen, sulfur, and/or phosphorous. Typical examples of the electron donative compound used herein are; ethers particularly aromatic ethers, such as diphenyl ether and anisole; siloxanes such as dimethylpolysiloxane; thioethers such as butyl sulfide; amines, particularly tert-amines, such as trioctylamine; and phosphoric acid esters such as butyl phosphate. Suitable amounts of the electron donative compound used are $1 \times 10^{-4}$ to $1 \times 10^{-2}$ mole, particularly $2 \times 10^{-4}$ to $1 \times 10^{-3}$ mole, per 1 g of the γ-titanium trichloride-containing solid product.

After reaction of the preliminary polymerization treated solid with said mixture, the product is separated and washed several times with an inert hydrocarbon solvent such as hexane, heptane, cyclohexane, methylcyclohexane, toluene, or xylene to give the solid catalyst component of the invention.

Using a catalyst system of the solid catalyst component of the present invention in combination with an organoaluminum compound as activator, highly stereospecific α-olefin polymers can be produced in high yields. Favorable organoaluminum compounds as activator for this polymerization include trialkyl aluminums, dialkylaluminum hydrides, and dialkylaluminum halides. Of these compounds, particularly preferred are diethylaluminum chloride and mixtures thereof with triethylaluminum. The amount of said organoaluminum compound used can be selected from such a wide range as from 0.1 to 500 moles, but the preferred range is from 0.5 to 200 moles, per mole of titanium atoms in the solid catalyst component. A known Lewis base can be added to the above catalyst system. Typical examples of the Lewis base are esters such as methyl methacrylate, ethyl benzoate, γ-butyrolactone, and ε-caprolactone and phosphorous acid esters such as triphenyl phosphite and tri-n-butyl phosphite. A chain transfer agent such as hydrogen can also be added for the purpose of regulating the molecular weight of the polymer. The polymerization is carried out usually at a temperature of 0° to 100° C., under a pressure of atmospheric to about 100 atm. in either continuous or batch operation. Suitable monomers for the polymerization are $C_2$–$C_{10}$ α-olefins, among which propylene is particularly preferred. However, the solid catalyst component of the present invention can also be used favorably for the random or heteroblock copolymerization of propylene and ethylene and/or another olefin such as butene-1. The polymerization can be carried out in any mode including the slurry polymerization employing an inert hydrocarbon or a liquid monomer as polymerization medium and the gas phase polymerization employing the monomer in the gaseous state.

The process of this invention is further illustrated with reference to the following examples, but the invention is not to be limited thereby.

EXAMPLE 1

A. Preparation of γ-titanium trichloride-containing solid product.

A 500-ml, 4-necked flask equipped with a stirrer and a dropping funnel was purged with argon. Then, 114 ml of n-heptane and 30 ml of titanium tetrachloride were charged into the flask. This solution was cooled at −10° C. A solution of 68.3 ml ethylaluminum sesquichloride in 150 ml of n-heptane was added dropwise thereto from the dropping funnel over a period of 2 hours while keeping the temperature in the flask within the range of −5° to −10° C. Thereafter, the mixture was further stirred for 30 minutes at room temperature, then heated to 80° C., and heat-treated for 1 hour at this temperature. After standing at room temperature, the resulting solid was separated from the liquid, washed 4 times with 200 ml each of n-heptane, and dried in vacuo, giving 58 g of a γ-titanium trichloride-containing solid product.

X-ray diffraction spectrum measurement (Cu-Kα) on the γ-titanium trichloride-containing solid product indicated that the intensity ratio of the spectral line due to the lattice spacing d=5.43 Å (hereinafter this diffraction peak height is designated as Ia) to the spectral line due to the lattice spacing d=5.83 Å (hereinafter this diffraction peak height is designated as Ib) was 0.16 (Ia/Ib×100=16%).

B. Preliminary polymerization treatment

After purging with argon of a 200-ml flask equipped with a stirrer, 110 ml of n-heptane, 1 ml of diethylaluminum chloride, and 22 g of the γ-titanium trichloride-containing solid product prepared in A above were charged into the flask to form a suspension. While stirring this suspension at 50° C., 6 g of propylene was gradually fed thereinto during 30 minutes to effect the preliminary polymerization treatment. Then, the resulting solid was separated from the liquid, washed twice with 50 ml each of n-heptane, and dried in vacuo, giving 27.6 g of a preliminary polymerization treated solid. The amount of propylene preliminarily polymerized was 0.25 g per 1 g of the γ-titanium trichloride-containing solid product.

C. Preparation of solid catalyst component

After purging with argon of a 100-ml flask equipped with a stirrer, 22.8 ml of toluene and 8.6 g of the preliminary polymerization treated solid prepared in B above were charged into the flask to form a suspension, and the temperature was kept at 85° C. While stirring the suspension, 6.8 ml of n-butyl ether was added thereto and reacted at 85° C. for 15 minutes. Then, a solution of 0.9 g iodine in 11.4 ml of toluene was further added and reacted at 85° C. for 45 minutes.

Thereafter, the resulting solid was separated from the liquid, washed once with 50 ml of toluene and 3 times with 50 ml each of n-heptane, and dried in vacuo, giving 5.2 g of a solid catalyst component. This solid catalyst component was found to have an average particle size of 17μ and good particle character.

D. Polymerization of propylene

After purging with argon of a 5-l stainless steel autoclave equipped with a stirrer, 1.5 l of dried n-7 heptane, 1.5 g of diethylaluminum chloride, 18 mg of ε-caprolactone, and 148.0 mg of the solid catalyst component prepared in C above were charged into the autoclave, and then hydrogen was added to a partial pressure of 0.4 Kg/cm$^2$. The temperature in the autoclave was raised to 60° C., and propylene was forced thereinto to a pressure of 6 Kg/cm$^2$ to initiate polymerization. The polymerization was continued for 2 hours at 60° C. while supplying propylene to maintain the above pressure. Thereafter the introduction of propylene was stopped and the unreacted propylene was discharged. The solid polymer was separated by filtration with a Büchner funnel and dried at 60° C., giving 198.8 g of polypropylene in powder form. The n-heptane was distilled off by evaporator from the filtrate, giving 2.8 g of an amorphous polymer.

The proportion of the n-heptane-insoluble polymer (hereinafter abbreviated as HIP %) in the whole polymer formed was 98.6%. The polymer yield (g) per 1 g of the titanium trichloride contained in the solid catalyst component (hereinafter this yield is designated as PP/TiCl$_3$) was 2070 (PP/TiCl$_3$=2070). The average particle size of the polymer was 300μ, the proportion of coarse particles of 500μ or more in diameter was 0.7 weight %, and the proportion of fine particles of up to 105μ in diameter was 0.2 weight %. Thus the polymer was excellent in particle character.

EXAMPLE 2

A. Preparation of solid catalyst component

After purging with argon of a 200-ml flask equipped with a stirrer, 43.5 ml of toluene and 16.0 g of the preliminary polymerization treated solid prepared in B of Example 1 were charged into the flask to form a suspension, and the temperature was kept at 85° C. While stirring the suspension, 12.9 ml of n-butyl ether and 0.4 ml of n-octylamine were added and reacted with the solid at 85° C. for 15 minutes. Then, a solution of 1.72 g iodine in 21.9 ml toluene was further added and reacted at 85° C. for 45 minutes. Thereafter, the resulting solid was separated from the liquid, washed once with 50 ml toluene and 3 times with 50 ml each of n-heptane, and dried in vacuo, giving 9.7 g of a solid catalyst component. This solid catalyst component was found to have an average particle size of 17μ and good particle character.

B. Polymerization of propylene

Using 159.9 mg of the solid catalyst component prepared in the preceding A, propylene was polymerized in the same manner as in D of Example 1. The results showed PP/TiCl$_3$=2120 and HIP=98.8%. The polymer contained 0.7 weight % of coarse particles of 500μ or more in diameter and 0.4 weight % of fine particles of up to 105μ in diameter.

COMPARATIVE EXAMPLE 1

A. Preparation of solid catalyst component

After purging with argon of a 200-ml flask equipped with a stirrer, 54.2 ml of toluene and 16.3 g of the γ-titanium trichloride-containing solid product prepared in A of Example 1 were charged into the flask and the temperature was kept at 85° C. Then, 16.0 ml of n-butyl ether and 0.45 ml of tri-n-octylamine were added and reacted with the solid product at 85° C. for 15 minutes. Then a solution of 2.14 g iodine in 27.0 ml of toluene was further added and reacted at 85° C. for 45 minutes. Thereafter, the resulting solid was separated from the liquid, washed once with 50 ml of toluene and 3 times with 50 ml each of n-heptane, and dried in vacuo, giving 9.2 g of a solid catalyst component. Considerable amounts of coarse particles and fine particles were found in the solid catalyst component.

B. Polymerization of propylene

Using 123.0 mg of the solid catalyst complnent prepared in the preceding A, propylene was polymerized in the same manner as in D of Example 1. The results showed PP/TiCl$_3$=1900 and HIP=98.7%. The polymer contained 63.1 weight % of coarse particles of 500μ or more in diameter and 2.7 weight % of fine particles of up to 105μ in diameter. Thus the polymer was markedly inferior in particle character.

COMPARATIVE EXAMPLE 2

A. Preparation of γ-titanium trichloride-containing solid product

A 300-ml, 4-necked flask equipped with a stirrer and a dropping funnel was purged with argon, then 76 ml of n-heptane and 30 ml of titanium tetrachloride were charged into the flask, and this solution was cooled at −10° C. A solution of 36 ml diethylaluminum chloride in 49 ml of n-heptane was added dropwise thereto from the dropping funnel over a period of 2 hours while keeping the temperature in the flask within the range of −5° to −10° C. Thereafter, the mixture was further stirred for 30 minutes at room temperature, and then heat-treated at 65° C. for 2 hours. After standing at room temperature, the resulting solid was separated from the liquid, washed 4 times with 200 ml each of n-heptane, and dried in vacuo, giving a γ-titanium trichloride-containing solid product.

X-ray diffraction measurement on the γ-titanium trichloride-containing solid product indicated that the intensity ratio (Ia/Ib) was 0.75. Consequently this solid product contained much β-titanium trichloride.

B. Preparation of solid catalyst component

Using the Y-titanium trichloride-containing solid product prepared in the preceding A, propylene was preliminarily polymerized in the same manner as in B of Example 1. From the resulting solid product, a solid catalyst component was prepared in the same manner as in A of Example 2. During the preparation, partial agglomeration of the catalyst component particles occurred, so that a considerable amount of coarse particles was found in the solid catalyst component. The average particle size of the solid catalyst component was 18μ.

C. Polymerization of propylene

Using 149.6 mg of the solid catalyst component prepared in the preceding B, propylene was polymerized in the same manner as in D of Example 1. The results showed PP/TiCl$_3$=1970 and HIP=98.3%. The polymer contained 12.1 weight % of coarse particles of 500μ or more in diameter and 0.5 weight % of fine particle of up to 105μ in diameter. Thus, it was found that coarse polymer particles considerably increased as compared with Examples of the invention.

EXAMPLE 3

A. Preparation of γ-titanium trichloride-containing solid product

A γ-titanium trichloride-containing solid product was prepared under the same conditions as given in A of Comparative Example 2 except that the heat treatment was conducted at 80° C. for 2 hours. X-ray diffraction measurement on this solid product indicated that the intensity ratio (Ia/Ib) was 0.31.

B. Preliminary polymerization treatment

The preliminary polymerization treatment was conducted in the same manner as in B of Example 1 except that the amount of propylene polymerized per 1 g of the γ-titanium trichloride-containing solid product was changed from 0.25 g to 0.05 g.

C. Preparation of solid catalyst component

Using the preliminary polymerization treated solid prepared in the preceding B, a solid catalyst component was prepared under the same conditions as given in A of Example 2. The obtained solid catalyst component had an average particle size of 18μ and good particle character.

D. Polymerization of propylene

Using 173.5 mg of the solid catalyst component prepared in the preceding C, propylene was polymerized in the same manner as in D of Example 1. The results indicated PP/TiCl$_3$=2140 and HIP=98.6%. The polymer contained 1.2 weight % of coarse particles of 500μ or more in diameter and 0.3 weight % of up to 105μ in diameter.

EXAMPLE 4

A. Preparation of solid catalyst component

After purging with argon of a 200-ml flask equipped with a stirrer, 52.2 ml of n-heptane and 19.2 g of the preliminary polymerization treated solid prepared in the same manner as in A and B of Example 1 were charged into the flask, and the temperature was kept at 85° C. Then, 15.5 ml of n-butyl ether and 0.44 ml of tri-n-octylamine were added and reacted with the solid at 85° C. for 15 minutes. Thereafter, a solution of 2.06 g iodine in 26.2 ml of n-heptane was further added and reacted at 85° C. for 1 hour. Then, the resulting solid was separated from the liquid, washed 5 times with 50 ml each of n-heptane, giving a solid catalyst component. This solid catalyst component had an average particle size of 17μ and good particle character.

B. Polymerization of propylene

Using 193.0 mg of the solid catalyst component prepared in the preceding A, propylene was polymerized in the same manner as in D of Example 1. The results indicated PP/TiCl$_3$=2210 and HIP=98.7%. The polymer contained 0.2 weight % of coarse particles of 500μ or more in diameter and 0.1 weight % of fine particles of up to 105μ in diameter.

EXAMPLE 5

Using a part of the solid catalyst component prepared in Example 2, propylene was polymerized in the same manner as in D of Example 1 but without addition of ε-caprolactone. The results indicated PP/TiCl$_3$=2010 and HIP=98.6%. The polymer contained 0.5 weight % of coarse particles of 500μ or more in diameter and 0.3 weight % of fine particles of up to 105μ in diameter.

EXAMPLE 6

Polymerization in liquid propylene

After purging with argon of a 1-l stainless steel autoclave equipped with a stirrer, 1.5 g of diethylaluminum chloride, 50 mg of methyl methacrylate, and 24.7 mg of the solid catalyst component prepared in Example 2 were charged into the autoclave, and hydrogen was added to a partial pressure of 0.66 Kg/cm$^2$. Successively 280 g of liquified propylene was charged and polymerized at 65° C. for 2 hours. Thereafter, the unreacted monomer was purged, and the formed polymer was dried in vacuo at 60° C. for 2 hours. Thus 106.6 g of a polypropylene powder was obtained. Accordingly, PP/TiCl$_3$=6640. The content of the atactic polymer soluble in cold xylene was 1.4 weight % of the whole polymer yield. The obtained polypropylene was practically free of coarse particles and fine particles, having good particle character.

EXAMPLE 7

Random ethylene-propylene copolymerization

After purging with argon of a 5-l stainless steel autoclave equipped with a stirrer, 1.5 l of dried n-heptene and 6.0 mg of ε-caprolactone were charged thereinto. Then, hydrogen and ethylene were added to partial pressures of 0.28 and 0.092 Kg/cm$^2$, respectively. The temperature in the autoclave was raised to 60° C., then propylene was fed to a total pressure of 4 Kg/cm$^2$, and successively 1.5 g of diethylaluminum chloride and 197 mg of the solid catalyst component prepared in Example 2 were added. Thus, copolymerization was conducted for 4 hours while keeping the total pressure at 4 Kg/cm² by supplying ethylene-propylene mixed gas (ethylene 5.4 vol. %). Thereafter, the introduction of the mixed gas was stopped and the unreacted monomers were purged. The formed copolymer was separated by filtration with a Buchner funnel, and dried at 60° C., giving 394 g of an ethylene-propylene copolymer in powder form. From the filtrate, 8.5 g of an amorphous polymer was obtained by distilling off the n-heptane with evaporator. Consequently, HIP was 97.9%. The yield of the copolymer per 1 g of the titanium trichloride contained in the solid catalyst component, that is, PP/TiCl₃ was 3140. Infrared absorption spectroscopy indicated that the copolymer contained 3.1 weight % of ethylene units. The copolymer was practically free of coarse particles and fine particles, having good particle character.

What is claimed is:

1. A solid catalyst component for polymerization of α-olefins obtained by steps of
    (i) reducing titanium tetrachloride with an organoaluminum compound represented by the general formula $R^1_n AlY_{3-n}$, wherein $R^1$ represents a $C_1$-$C_{18}$ hydrocarbon group, Y represents a halogen, and n represents a number satisfying $1 < n < 3$,
    (ii) heat-treating the reduction product at a temperature range of 70° to 130° C., wherein the period of the heat treatment is between 15 minutes and 6 hours,
    (iii) treating the thus obtained solid product containing γ-titanium trichloride by preliminary polymerization of an α-olefin in the presence thereof, wherein the amount of α-olefin preliminary polymerized is 0.01 to 5 g per 1 g of the solid product,
    (IV) reacting the resulting solid product with a halogen represented by the general formula $X_2$, wherein X represents Cl, Br, or I, and/or an interhalogen compound represented by the general formula $X'X''_a$, wherein X' and X'' represent each Cl, Br, or I and a represents 1 or 3, and with an ether compound represented by the general formula $R^2$—O—$R^3$, wherein $R^2$ and $R^3$ are the same or different and represent each a $C_1$-$C_{10}$ alkyl group, in a hydrocarbon solvent at a temperature of 50° to 100° C.

2. The solid catalyst component according to claim 1, wherein the organoaluminum compound represented by the general formula $R^1_n AlY_{3-n}$ for use in the reduction of titanium tetrachloride is diethylaluminum chloride, ethylaluminum sesquichloride, a mixture of these compounds, or a mixture of ethylaluminum sesquichloride with ethylaluminum dichloride.

3. The solid catalyst component according to claim 1 wherein the temperature of the heat treatment is 75° to 110° C.

4. The solid catalyst component according to claim 1, wherein the temperature of the preliminary polymerization treatment is 25° to 80° C.

5. The solid catalyst component according to claim 1, wherein the α-olefin used for the preliminary polymerization treatment is ethylene or propylene.

6. The solid catalyst component according to claim 5, wherein the α-olefin used for the preliminary polymerization treatment is propylene.

7. The solid catalyst component according to claim 1, wherein the halogen represented by the general formula $X_2$ is $I_2$.

8. The solid catalyst component according to claim 1, wherein the ether compound represented by the general formula $R^2$—O—$R^3$ is di-n-butyl ether or diisoamyl ether.

* * * * *